United States Patent [19]

Haydock

[11] Patent Number: 5,176,590
[45] Date of Patent: Jan. 5, 1993

[54] PLANETARY LOCKING DIFFERENTIAL
[75] Inventor: Stephen J. Haydock, Fort Wayne, Ind.
[73] Assignee: Dana Corporation, Toledo, Ohio
[21] Appl. No.: 736,838
[22] Filed: Jul. 29, 1991
[51] Int. Cl.$^5$ .............................................. F16H 1/44
[52] U.S. Cl. ..................................... 475/249; 475/346
[58] Field of Search ............... 475/249, 252, 231, 240, 475/241, 346

[56] References Cited

U.S. PATENT DOCUMENTS

| | | |
|---|---|---|
| 677,771 | 7/1901 | Birdsall . |
| 1,108,800 | 8/1914 | Shrader ........................... 475/252 X |
| 3,420,121 | 1/1969 | Stieg . |
| 3,656,573 | 4/1972 | Halberg ........................... 475/249 X |
| 4,074,591 | 2/1978 | Dick ..................................... 475/249 |
| 4,440,042 | 4/1984 | Holdeman ........................ 475/346 X |
| 4,677,875 | 7/1987 | Batchelor ......................... 475/249 X |
| 4,715,248 | 12/1987 | Gant . |
| 4,781,078 | 11/1988 | Blessing et al. ................. 475/249 X |
| 5,024,634 | 6/1991 | Blessing ........................... 475/249 X |

FOREIGN PATENT DOCUMENTS 2233051  1/1991  United Kingdom ................ 475/249

Primary Examiner—Leslie A. Braun
Assistant Examiner—Benjamin Levi
Attorney, Agent, or Firm—Frank B. McDonald

[57] ABSTRACT

A planetary differential assembly for selectively locking a pair of coaxially aligned vehicular axles for driving the axles at same rotational speeds. The assembly incorporates an axially moveable locking ring having an annular central body and first and second axially extending coupling portions spaced radially apart about inner and outer diametric portions of the body. One of the coupling portions is adapted to receive a shift actuator flange for axial displacement of the locking ring between engaged and disengaged positions of the differential. In a preferred form, the radially innermost coupling portion of the locking ring continuously engages and is axially displaceable on a sun gear, while the radially outer coupling portion of the locking ring is selectively engageable with a splined planetary carrier. In the same preferred embodiment, the actuator flange is constructed as a pair of U-shaped plates secured rigidly to a bracket external to the differential case for receiving a shift fork to provide axial displacement of the locking ring.

8 Claims, 3 Drawing Sheets

PLANETARY LOCKING DIFFERENTIAL

BACKGROUND OF THE INVENTION

This invention relates to differentials of the type including planetary gearing for heavy duty vehicles More particularly, the invention relates to locking differentials for axle shafts.

Most "planetary" differential assemblies employed in heavy duty vehicular operations are utilized in gear reduction applications, such as transfer cases. It has not been common practice to employ planetary differentials in axle applications, where torque is split on a 50—50 basis. Thus, standard rear driving axles of almost all heavy trucks are "beveled" gear differentials similar to those provided in passenger cars.

Where, however, "non-standard" planetary differentials have been utilized in rear drive axles of trucks, such differentials have typically incorporated an electromagnetically actuated limited slip function, utilizing friction plates. In some designs, the friction plates can be selectively engaged to "positively" lock the coaxial shafts together, resulting in avoidance of differential action on demand, such as when the vehicle is traveling over slippery roads during inclement weather conditions, for example.

A major drawback, however, is realized when the friction plates become worn under the numerous cycles of electromagnetic actuation which occur during their useful lives. After such wear, the ability of the operator to positively lock the vehicle becomes somewhat "less than positive". A preferred system would establish a truly "positive" lock; one not relying on friction plates which become worn and thus lose effectiveness in normal operations.

SUMMARY OF THE INVENTION

The planetary differential assembly of the present disclosure provides a positive differential locking assembly which does not rely on the use of friction plates or discs. In one preferred form, the assembly is adapted for driving a pair of coaxial vehicular axles, and includes a rotatable case having an internal ring gear fixed to the case. Revolving within the ring gear are sets of planetary pinion gear pairs, one gear of each pair being in mesh with the ring gear. Each pair of pinion gears is supported on a planetary carrier, and the other of each pair is in mesh with a sun gear which is coaxial to, and radially centered within, the ring gear. The carrier is splined to one of the axles, while the sun gear is splined to the other axle. A locking ring is selectively splined to the carrier, the locking ring being axially slidable on, and piloted on, the sun gear. A shift actuator, coupled to the locking ring, is adapted for interaction with a shift fork external to the differential case. The locking ring is axially shifted by the actuator from a first fully locked or "engaged" condition of the differential to a second, unlocked or "disengaged" condition wherein the locking ring becomes completely disengaged from the carrier.

The locking ring is formed as a unitary member including a central body annulus having inner and outer diametric portions, a first coupling portion extending axially from one of the diametric portions of the annulus, and a second coupling portion extending in reverse orientation from the second diametric portion of the annulus. The first coupling portion of the locking ring also includes an annular collar spaced from the annulus and adapted for mechanical coupling for axial displacement of the locking ring toward the disengaged position.

DETAILED DESCRIPTION OF A PREFERRED EMBODIMENT

Figure 2:
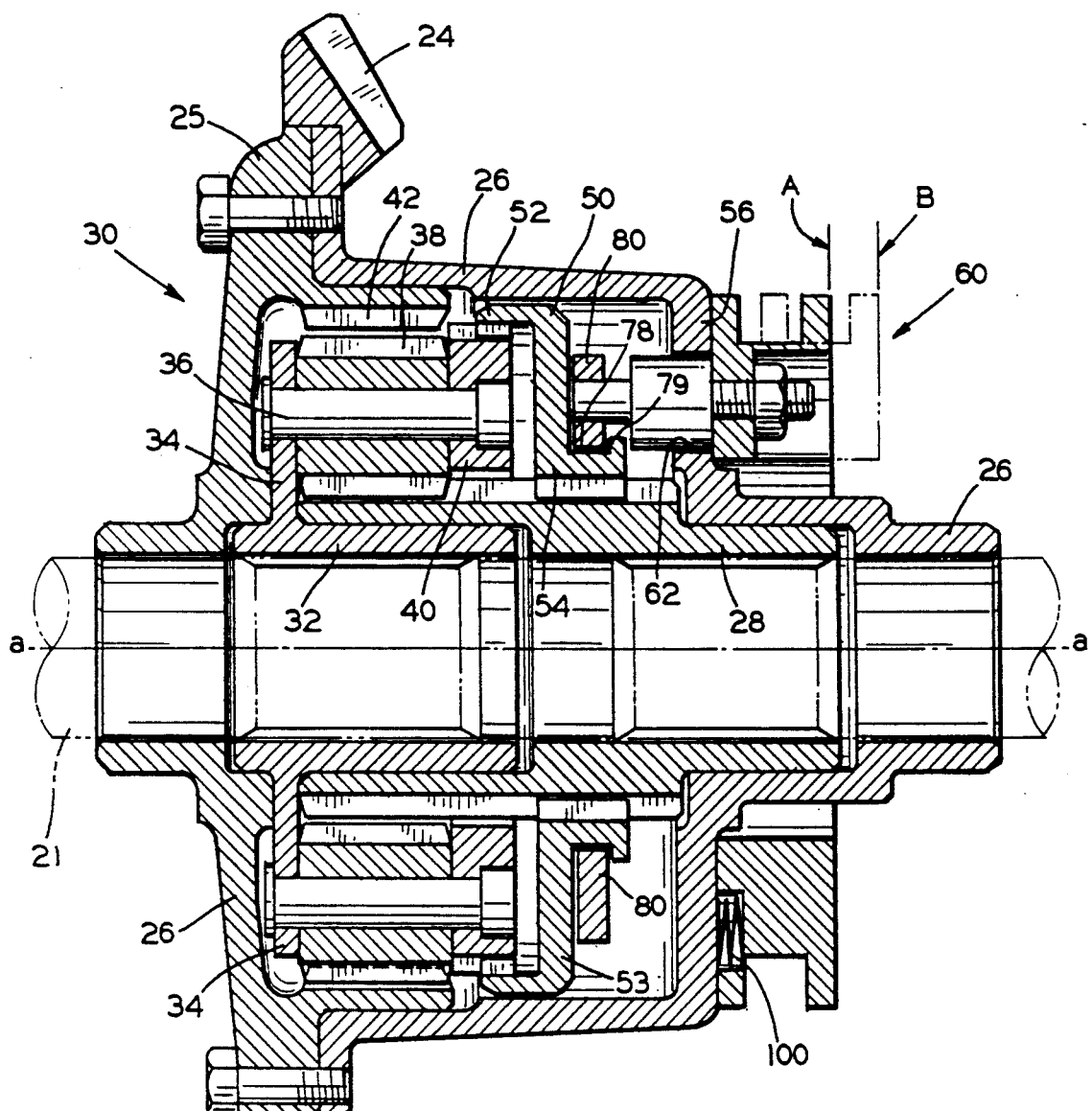
FIG. 2 is a cross-sectional view of a planetary locking differential constructed in accordance with the present invention.
Figure 1:
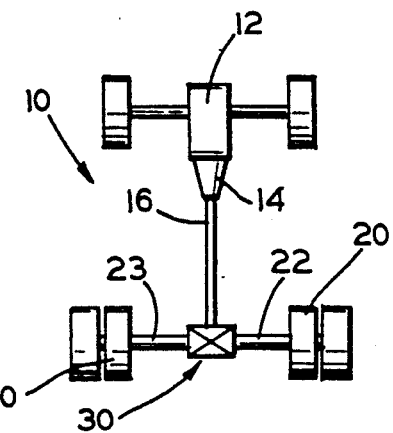
FIG. 1 is a schematic view of a vehicular drivetrain which incorporates a preferred embodiment of a planetary locking differential of the present invention.

Referring initially to FIG. 1, a heavy truck drivetrain 10 incorporates an engine 12, a transmission 14 coupled to the engine, and a rotary driveshaft 16 driven via the transmission. Referring also to FIG. 2, the driveshaft includes a beveled pinion gear 18 adapted for engagement with a beveled driveline ring gear 24 fixedly mounted to a planetary differential 30. The drivetrain (FIG. 1) incorporates sets of driven wheels 20 on a pair of drive axles 22,23.

The planetary differential 30 is detailed in the cross-sectional view of FIG. 2. The ring gear 24 is rigidly secured to a ring gear flange 25 on a rotary differential case 26. The axles 22,23 (FIG. 1) are externally splined at their inboard ends 21 (shown in phantom in FIG. 2), which extend, respectively, into an internally splined sun gear 28 and an internally splined planetary carrier hub 32. The gear 28 and hub 32 are supported for relative rotation with respect to each other within the differential case 26, as those skilled in this art will appreciate.

Figure 3:
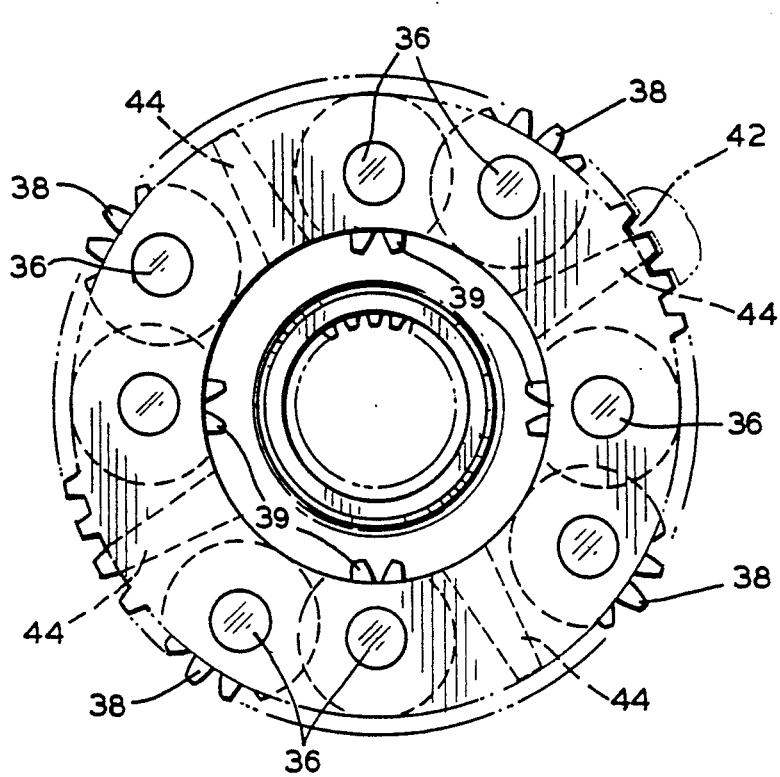
FIG. 3 is a schematic face view of pairs of planetary gearing employed in the planetary locking differential of the present invention.
Figures 4, 5:
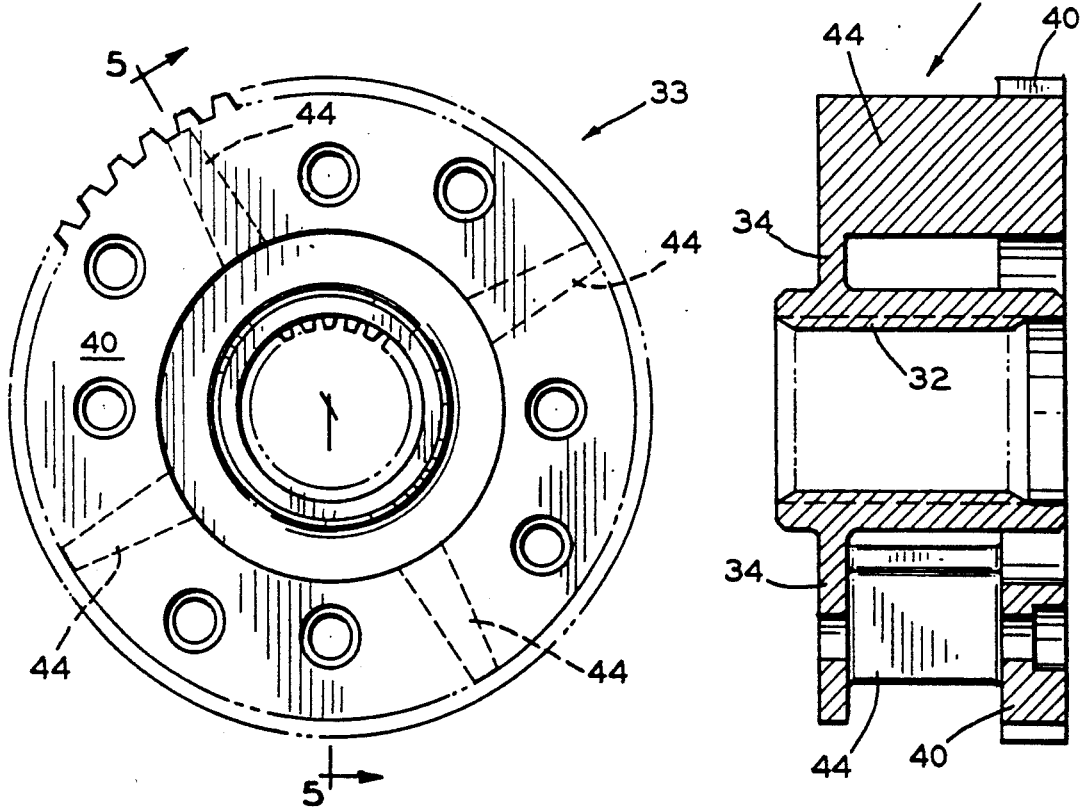
FIG. 4 is an end face view of a planetary carrier employed in the planetary locking differential of the present invention.
FIG. 5 is a cross-sectional elevation of the planetary carrier of FIG. 4, taken along lines 5—5.

Referring now also to FIGS. 3, 4, and 5, the planetary carrier hub 32 is an integral part of a planetary carrier unit 33 which incorporates an integral hub flange 34 as shown. The flange 34 supports a plurality of carrier shafts 36 (FIG. 2) which support sets, or pairs 38, 39 (FIG. 3), of planetary pinion gears for rotation between the sun gear 28 and a planetary ring gear 42 fixed to the case 26. The carrier shafts 36 are supported also at their ends opposite the hub flange 34 via a carrier coupler 40 (FIGS. 2, 4, and 5). The coupler 40 is integrally attached to the hub flange 34 via a plurality of axially extending struts 44 (FIGS. 3, 4, and 5) which extend interdigitally between pairs of planetary pinion gears 38,39.

The differential 30 can be rigidly locked to assure that the axles 22,23 rotate together. For this purpose, a locking ring 50 (FIG. 2) is piloted on, and axially moveable along, the sun gear 28 for selective engagement with the externally splined carrier coupler 40. The locking ring includes an axially extending radially outer portion 52 which is internally splined, and an internally splined radially inner portion 54 which is splined to and remains in constant sliding engagement with the sun gear 28. The locking ring has a central body defined by a radially extending annulus 53 which supports each of the portions 52 and 54 in a radially spaced, reversely oriented position with respect to the other.

Figure 6:
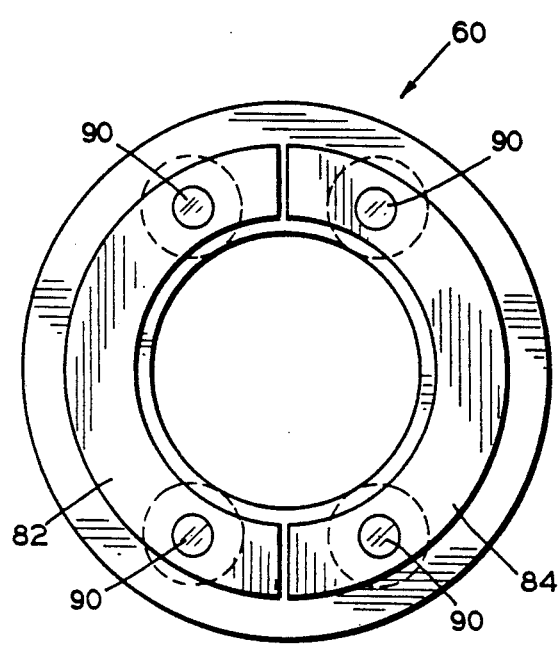
FIG. 6 is an end face view of a shift actuator employed in the present invention.
Figure 7:
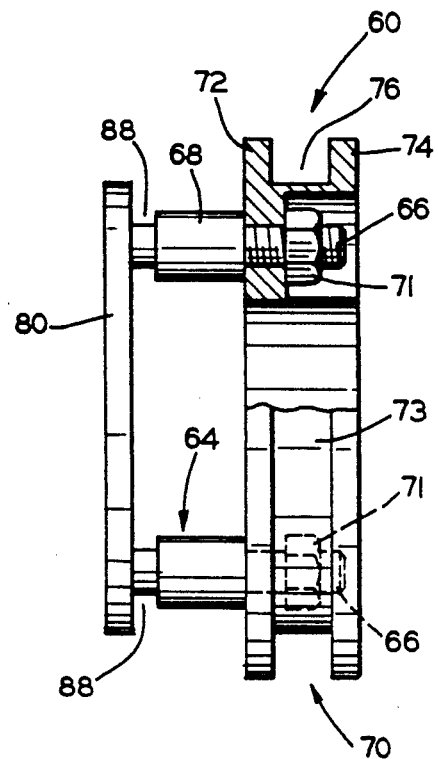
FIG. 7 is a side elevation of the actuator of FIG. 6.
Figure 8:
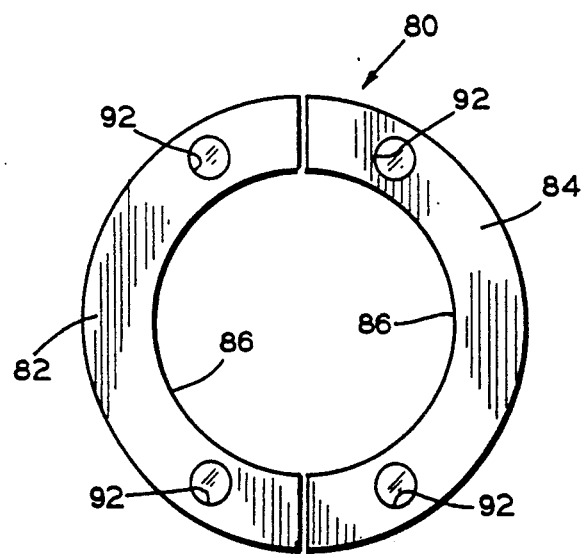
FIG. 8 is a face view of an inner shift flange formed of a pair of U-shaped plates.
Figure 9:
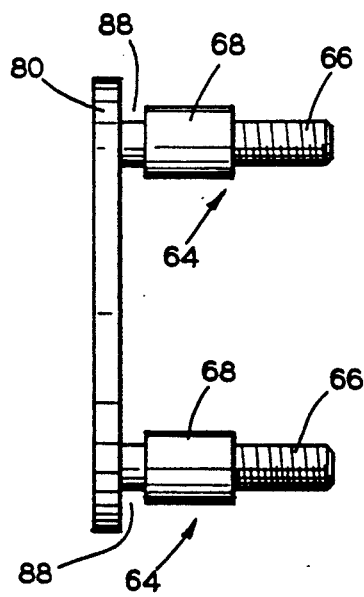
FIG. 9 is a side elevation of the inner shift flange along with actuator stud shafts.

Referring also to FIGS. 6 and 7, a shift assembly 60 includes an inner shift flange 80 adapted to engage an exterior radial groove 78 (FIG. 2) in the inner portion 54 of the locking ring 50. The groove 78 is bounded by a collar 79. The collar facilitates axial displacement of the locking ring 50 between engaged and disengaged positions. Referring to FIG. 7, proper interfacing of the collar 79 requires a clearance groove or recess 88 between the flange 80 and the slide portions 68 of the shift assembly 60. Referring also to FIGS. 8 and 9, the inner shift flange 80 is formed of a pair of U-shaped plates 82, 84 to facilitate assembly of the radially inner portions 86 of the plates into the groove 78 of the, preferably single piece, annular locking ring 50.

The plates 82, 84 which form the flange 80 are secured rigidly to a bracket 70 (FIG. 7) which is external to the case 26, but axially moveable relative thereto. For this purpose, a plurality of elongated stud shafts 64, having flat mounting heads 90, extend through chamfered apertures 92 in the plates 82,84. The shafts 64 are threaded at 66, and are secured to the external shift bracket 70 via nuts 71. Each stud shaft 64 incorporates an enlarged diameter slide portion 68, and each portion 68 extends through an aperture 62 (FIG. 2) in an endwall 56 of the case 26.

The shift bracket 70 includes a pair of spaced flanges 72,74 which extend radially from an integral central annular body portion 73 (FIG. 7). The spaced flanges 72,74 define an annular channel 76 for receiving an externally actuated shift fork (not shown) adapted to axially displace the shift assembly 60 for selectively shifting the locking ring between engaged and disengaged positions "A" and "B" (FIG. 2).

Finally, as an option, the planetary locking differential 30 may be normally biased by a spring system 100 (FIG. 2) to a normally open or disengaged position. The spring system, herein disclosed as a plurality of circumferentially spaced coils, is situated between the case endwall 56 and the flange 72 of the shift bracket 70. Although shown herein as a coil spring system, the system 100 could alternatively comprise, as examples, a Belleville spring or a wave washer.

Although only one preferred embodiment has been detailed and described herein, the following claims are envisioned to cover numerous additional embodiments neither shown nor described.

What is claimed is:

1. In a planetary differential assembly for driving a pair of coaxially aligned axles, said assembly including a rotatable case, an internal ring gear fixed to said case, a plurality of planetary pinion gear pairs, one gear of each pair in mesh with said ring gear, said assembly further including a planetary carrier supporting said pairs of planetary pinion gears, said assembly further including a sun gear splined to one of said axles, wherein said carrier is splined to the other axle of said pair of axles, wherein the other gear of each pair of said pinion gears is in mesh with said sun gear; an improvement comprising: (1) an axially moveable locking ring having a first coupling portion splined to and in continuous engagement with said sun gear, said locking ring having a second coupling portion adapted for selective engagement with said carrier, said second portion being spaced radially from said first portion, and (2) a shift actuator coupled with said locking ring for axial displacement of said locking ring from a first fully locked condition of said differential, wherein said second coupling portion of said locking ring engages said carrier, to a second, unlocked condition of said differential, wherein said second coupling portion is completely disengaged from said carrier, wherein said shift actuator comprises an inner shift flange, and wherein said first coupling portion of said locking ring comprises a radially outer actuator receiving groove defined by a radially extending annulus and collar spaced axially therefrom, wherein said inner shift flange engages said actuator receiving groove, wherein said shift actuator further comprises a bracket situated externally of said case, and a plurality of stud shafts positioned for securement of said inner shaft flange and said bracket together for axial displacement of said shift actuator relative to said case.

2. The planetary differential assembly of claim 1 wherein said locking ring comprises a central body defining said radially extending annulus having inner and outer diametric portions, and wherein one of each of said first and second radially spaced coupling portions is fixed respectively to one of said inner and outer diametric portions, and wherein each coupling portion is axially extending and has a reverse orientation with respect to the other.

3. The planetary differential assembly of claim 2 wherein said first coupling portion of said locking ring further comprises said collar axially spaced from said radially extending annulus, said collar adapted for interface with said shift actuator.

4. The planetary differential assembly of claim 3 wherein said carrier comprises a coupler, wherein said coupler is splined for engagement with said locking ring, said coupler being formed as an integral part of said carrier.

5. The planetary differential assembly of claim 4 wherein said case defines an endwall having apertures, wherein said stud shafts include slide portions adapted to engage said case endwall apertures, and wherein said slide portions are integral to said stud shafts.

6. The planetary differential assembly of claim 5 wherein said inner shift flange comprises a pair of half portions defined by U-shaped plates, said plates being adapted to facilitate assembly of said inner shift flange into the radial groove of said locking ring.

7. The planetary differential assembly of claim 6 wherein said carrier comprises a hub and said carrier coupler is rigidly supported about said hub by means of (a) a radial flange extending from said hub, and (b) a plurality of axially extending struts integrally cast with said hub, said flange, and said carrier coupler.

8. The planetary differential assembly of claim 7 further comprising a biasing spring positioned between said endwall of said case and said bracket of said actuator for normally biasing said differential to an open, disengaged position.

* * * * *